US011842129B1

(12) United States Patent
Adolf et al.

(10) Patent No.: US 11,842,129 B1
(45) Date of Patent: Dec. 12, 2023

(54) FINITE FLOATING-POINT NUMERICAL SIMULATION AND OPTIMIZATION

(71) Applicant: X Development LLC, Mountain View, CA (US)

(72) Inventors: Brian John Adolf, San Mateo, CA (US); Martin Friedrich Schubert, Mountain View, CA (US); Jesse Lu, East Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 172 days.

(21) Appl. No.: 16/886,602

(22) Filed: May 28, 2020

(51) Int. Cl.
*G06F 30/23* (2020.01)
*G06N 3/08* (2023.01)
*G06F 7/483* (2006.01)
*G06F 111/10* (2020.01)

(52) U.S. Cl.
CPC .............. *G06F 30/23* (2020.01); *G06F 7/483* (2013.01); *G06N 3/08* (2013.01); *G06F 2111/10* (2020.01)

(58) Field of Classification Search
CPC ...... G06F 30/23; G06F 7/483; G06F 2111/10; G06N 3/08
See application file for complete search history.

(56) References Cited

U.S. PATENT DOCUMENTS

| 6,356,681 | B1 | 3/2002 | Chen |
| 6,408,119 | B1 | 6/2002 | Meltz et al. |
| 6,456,762 | B1 | 9/2002 | Nishiki |
| 6,477,194 | B1 | 11/2002 | Eng |
| 6,681,067 | B1 | 1/2004 | Kersey |
| 6,768,850 | B2 | 7/2004 | Dugan et al. |
| 6,847,762 | B2 | 1/2005 | Sweetser et al. |
| 6,946,684 | B2 | 9/2005 | Shigihara |
| 6,956,994 | B2 | 10/2005 | Bernard |
| 8,380,027 | B2 | 2/2013 | Reed |

(Continued)

OTHER PUBLICATIONS

Damask, "Integrated-Optic Grating-Based Filters For Optical Communications Systems," Thesis for the degree of Doctor of Philosophy, Massachusetts Institute of Technology, May 6, 1996, 282 pages.

(Continued)

*Primary Examiner* — Kibrom K Gebresilassie
(74) *Attorney, Agent, or Firm* — Fish & Richardson P.C.

(57) ABSTRACT

Methods, systems, and apparatus, including computer programs encoded on computer storage media, for correcting finite floating-point numerical simulation and optimization. Defining a loss function within a simulation space composed of a plurality of voxels each having an initial degree of freedom, the simulation space encompassing one or more interfaces of the component; defining an initial structure for the one or more interfaces in the simulation space; calculating, using a computer system with a finite floating-point precision, values for an electromagnetic field at each voxel using a finite-difference time domain solver to solve Maxwell's equations; and determining, for each voxel, whether to increase a respective numerical precision of respective values representing behavior of the electromagnetic field at the voxel above a threshold precision by the computer system and, in response, assigning one or more additional degrees of freedom to the voxel.

21 Claims, 5 Drawing Sheets

(56) References Cited

U.S. PATENT DOCUMENTS

| | | | |
|---|---|---|---|
| 10,592,732 B1* | 3/2020 | Sather | G06K 9/6271 |
| 11,092,746 B1 | 8/2021 | Adolf et al. | |
| 11,604,957 B1 | 3/2023 | Schubert et al. | |
| 2003/0186142 A1 | 10/2003 | Deshmukh et al. | |
| 2004/0028104 A1 | 2/2004 | Buda | |
| 2004/0196884 A1 | 10/2004 | Ohkubo | |
| 2005/0226558 A1 | 10/2005 | Kim et al. | |
| 2006/0078258 A1 | 4/2006 | Anisimov et al. | |
| 2008/0013581 A1 | 1/2008 | Kobayashi | |
| 2008/0089374 A1 | 4/2008 | Eichler | |
| 2010/0142566 A1 | 6/2010 | Liu et al. | |
| 2011/0102799 A1 | 5/2011 | Matejka et al. | |
| 2016/0012176 A1* | 1/2016 | Liu | G02B 6/125 716/112 |
| 2016/0164260 A1 | 6/2016 | Chua | |
| 2017/0024356 A1* | 1/2017 | Angerer | G06F 30/23 |
| 2017/0179680 A1 | 6/2017 | Mahgerefteh | |
| 2018/0024297 A1 | 1/2018 | Bovington et al. | |
| 2018/0045953 A1* | 2/2018 | Fan | G02B 5/18 |
| 2018/0053334 A1* | 2/2018 | Schneider | G06T 15/08 |
| 2019/0097722 A1 | 3/2019 | McLaurin et al. | |
| 2019/0179016 A1 | 6/2019 | Raring et al. | |
| 2020/0050715 A1* | 2/2020 | Krishnamurthy | G06F 30/20 |
| 2020/0226221 A1 | 7/2020 | Lu et al. | |
| 2021/0007702 A1 | 1/2021 | Lee et al. | |
| 2021/0305767 A1 | 10/2021 | Schubert et al. | |

OTHER PUBLICATIONS

Winick et al., "Design of Grating-Assisted Waveguide Couplers with Weighted Coupling," Journal of Lightwave Technology, Nov. 1991, 9(11):1481-1491.

News.mit.edu [Online] "New system allows optical deep learning," Jun. 12, 2017, retrieved on Oct. 9, 2018, retrieved from URL <http://news.mit.edu/2017/new-system-allows-optical-deep-learning-0612>, 3 pages.

Lee et al., "Metasurface eyepiece for augmented reality," Nature Communications, Nov. 2018, Nature communications, Nov. 2018, 9(1):1-10.

Molesky, "Outlook for inverse design in nanophotonics," CoRR, Jan. 2018, arxiv.org/abs/1801.06715, 13 pages.

Piggott et al., "Fabrication-constrained nanophotonic inverse design," Scientific Reports, May 2017, 7(1786):1-7 pages.

Springer.com [Online] "Supplementary Information: Fabrication-constrained nanophotonic inverse design," May 2017, retrieved on Oct. 9, 2018, retrieved from URL <https://staticcontent.springer.com/esm/art%3A10.1038%2Fs41598-017-019392/MediaObjects/41598_2017_1939_MOESM2_ESM.pdf>, 10 pages.

Tahersima et al., "Deep Neural Network Inverse Design of Integrated Nanophotonic Devices," CoRR, Sep. 2018, arxiv.org/abs/1809.03555, 8 pages.

Bernhardi, "Fourteen Philosophy Thesis Topic Ideas for University Students," Dissertation for the degree of Doctor University of Twente, Integrated Optical MicroSystems (IOMS) group, Faculty of Electrical Engineering, Mathematics and Computer Science, MESA+ Institute for Nanotechnology, Apr. 1982, 169 pages.

Frei et al., "Topology optimization of a photonic crystal waveguide termination to maximize directional emission," Appl. Phys. Lett. 86, Mar. 2005, 86:111114.

Udupa et al., "Voxelized Topology Optimization for Fabrication Compatible Inverse Design of 3D Photonic Devices," Optics Express, Jul. 2019, 27(15):21988-21998.

Yin, "Photonic Inverse Design for 3-D Structures and Optical Phase Change Materials," Massachusetts Institute of Technology, Jun. 2019, 85 pages.

Mauricio et al., "Design Framework for nnetasurface optics-based convolutional neural networks," Applied Optics, May 2021, 60(15):4356-4365.

Sitzmann et al., "End-to-end Optimization of Optics and Image Processing for Achromatic Extended Depth of Field and Super-resolution Imaging," ACM Trans. Graph., Aug. 2018, 37(4):1-13.

Borel et al., "Topology optimization and fabrication of photonic crystal structures," Optics Express, May 2004, 12(9):6 pages.

Boutanni et al., "Efficient pixel-by-pixel optimization of photonic devices utilizing the Dyson's equation in a Green's function formalism: Part II. Implementation using standard electromagnetic solvers," Journal of the Optical Society of America, Sep. 2019, 36(9)2387-2394.

Molesky et al., "Inverse design in nanophotonics," Nature Photonics, Nov. 2018, 12:659-670.

Piggot, "Automated Design of Puotonic Devices," Dissertation for the degree of Doctor of Philosophy, Stanford University, Department of Electrical Engineering, Jun. 2018, 114 pages.

Xu et al., "Navigating through complex photonic design space using machine learning methods," SPIE Optics + Optoelectronics, Apr. 2019, 11031:110310S-1.

Yu et al., "Inverse-Design-based Light Via for Multi-Layer Photonic Integration Circuit," 2018 Asia Communications and Photonics Conference, 2018, 3 pages.

Andkjaer et al., "Topology-optimized broadband surface relief transmission grating," Proc. SPIE, Physics and Simulation of Optoelectronic Devices, Mar. 7, 2014, 8980:898006-2.

Ghanem et al., "Information Fusion: Scaling Subspace-Driven Approaches," arXiv:2204.12035, Apr. 26, 2022, 18 pages.

Guo et al. "Study on a Recurrent Convolutional Neural Network Based FDTD Method," 2019 International Applied Computational Electromagnetics Society Symposium—China (ACES), Oct. 31, 2022, 9 pages.

Hughes, "Adjoint-Based Optimization and Inverse Design oh Photonic Devices," Thesis for the degree of Doctor of Philosophy, Stanford University, Department of Applied Physics, Aug. 2019, 158 pages.

Ingersoll, "Multiplexed Volume Bragg Gratings in Narrowand Broadband Spectral Systems: Analysis and Application," Thesis for the degree of Philosophy, University of Minnesota, May 2015, 129 pages.

Kores et al., "Temperature Dependence of the Spectral Characteristics of Distributed-Feedback Resonators," Optics Express, Feb. 19, 2018, 26(4):4892-905.

Lai et al., "Distributed Bragg Reflector Fiber Laser Fabricated by Frmtosecond Laser Inscription," Optics Letters, Jun. 2006, 31(11): 3 pages.

Li et al. "Enabling High Performance Deep Learning Networks on Embedded Systems," IECON 2017—43rd Annual Conference of the IEEE Industrial Electronics Society, Nov. 1, 2022, 6 pages.

Researchgate.net [online], "Optical Multiplexing and Demultiplexing," Apr. 2003, retrieved on Nov. 9, 2022, retrieved from URL<https://www.researchgate.net/publication/229479977_Optical_Multiplexing_and_Demultiplexing/link/61080e5c0c2bfa282a178420/download/>, 2 pages.

Tahersima et al., "Nanostructured Photonic Power Splitter Design via Convolutional Neural Networks," 2019 Conference on Lasers and Electro-Optics, Oct. 31, 2022, 2 pages.

Tasyurek, "Wavelength Demultiplexing Using Multilayer Structures With Frustrated Total Internal Reflection," Dissertation for the degree of Doctor of Philosophy, Stanford University, Department of Electrical Engineering, Mar. 2015, 205 pages.

Trivedi, et al., "Data-driven acceleration of photonic simulations," Scientific Reports, Dec. 23, 2019, 9:19728.

Wikipedia.com (Online) "Kernel (image processing)," Dec. 7, 2019, retrieved on Oct. 11, 2022, retrieved from URL«https://en.wikipedia.org/w/index.php?title=Kernel_(image_processing)&oldid=929690058»,  6 pages.

\* cited by examiner

FINITE FLOATING-POINT NUMERICAL SIMULATION AND OPTIMIZATION

BACKGROUND

Numerical computations generally use floating-point arithmetic in which real numbers are represented as an approximation that includes a fixed number of significant digits that is scaled using an exponent in a fixed base (e.g., base two, ten, or sixteen). Approximating numbers this way generally improves the speed of numerical calculation and involves a tradeoff between range and precision.

SUMMARY

The disclosure relates to improving the accuracy and reliability of numerical simulations that involve floating-point operations, and more particularly in numerical simulations used in inverse design techniques. For example, numerical simulation of highly resonant structures or optimization of devices that present vanishing gradients can present a problem due to finite floating-point precision. Underflow or overflow, for instance, can result in loss of information, diminishing accuracy. In such cases, simulations might not proceed past a certain point, and even local optima for structures might not be found because of this issue. Moreover, running numerical simulations on reduced precision hardware (e.g., certain Tensor Processing Units (TPUs)) can make this problem come up sooner than it otherwise would.

Inverse design methods can involve numerical simulations in the design of optical or photonic components based on a loss function defining a desired electromagnetic (EM) field profile for the component, and optimizing the composition and structure of the component by numerically solving Maxwell's equations for optical modes of interest using, e.g., a finite-difference time domain method. Solutions to the inverse problem may be subject to other constraints, such as manufacturability of the interface. The issues for floating-point operations described above can manifest in such simulations, e.g., where the calculated loss is very large or very small.

Techniques are disclosed for reducing such problems by including multiple degrees of freedom in the same voxel and expressing a relationship between those variables that allow them to function with greater numerical precision. In this specification, the degrees of freedom of a voxel refer to an amount of memory set-aside in a system for storing values associated with the voxel. The amount of additional memory corresponding to an additional degree of freedom can vary from implementation-to-implementation. In general, additional degrees of freedom correspond to more memory for representing floating-point values with higher precision, at the cost of additional memory and complexity.

For example, a degree of freedom can correspond to a word having a number of bits defined by the architecture of a computing device executing a system. Adding additional degrees of freedom to represent the values of a voxel can include adding additional bits according to the pre-determined word size of the word. For example, for a computing device implementing an electromagnetic field simulation system and one or more processors operating on 16-bit words, one degree of freedom can correspond to representing values of a voxel as a 16-bit floating-point value on a system. Adding an additional degree of freedom in this example system can include adding one or more 16-bit words to represent values of the voxel.

As another example, as EM waves decay and numerical precision becomes an issue (or as they accumulate and would otherwise produce overflow) additional variables can be introduced (and RAM allocated potentially if not pre-allocated) to account for this extra information. Each variable can correspond to a particular data-type of a pre-determined size, e.g., a float or a double.

Values corresponding to a voxel can be represented a number of different ways, including mantissa and exponent, or another mapping (e.g., monotonic 1-to-1 or not) including by a neural network trained to act as a black box floating-point operator specifically for electromagnetics (or other domain-specific) simulations. The architecture of the network, along with the weights, represents a model that generates a software floating-point representation. This means that multiple inputs and outputs can get mapped in a way that preserves accuracy and precision despite the underlying data being used to represent these relationships being the same finite precision that had the problems to begin with.

In general, one innovative aspect of the subject matter described in this specification can be embodied in methods that include the actions of defining a loss function within a simulation space composed of a plurality of voxels each having an initial degree of freedom, the simulation space encompassing one or more interfaces of the component, the loss function corresponding to a target electromagnetic field distribution for the component; defining an initial structure for the one or more interfaces in the simulation space; calculating, using a computer system with a finite floating-point precision, values for an electromagnetic field at each voxel using a finite-difference time domain solver to solve Maxwell's equations; and determining, for each voxel, whether to increase a respective numerical precision of respective values representing behavior of the electromagnetic field at the voxel above a threshold precision by the computer system and, in response, assigning one or more additional degrees of freedom to the voxel, wherein the one or more additional degrees of freedom are related to the initial degree of freedom to increase numerical precision of values corresponding to the voxel.

Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

The degree of freedom corresponds to a word in memory defined by the computer system, and wherein, as a consequence of assigning the one or more additional degrees of freedom to the voxel, numerical precision for the voxel is increased by a factor corresponding to one or more additional words.

The threshold precision is a first threshold precision, and a method further comprises: determining, for each voxel, whether to decrease the respective numerical precision of respective values representing behavior of the electromagnetic field at the voxel below a second threshold precision, and in response, removing one or more degrees of freedom for the voxel.

Calculating the values for the electromagnetic field at each voxel comprises performing the calculating before the determining and until meeting the one or more halting criteria.

A method further comprises calculating updated respective values for the electromagnetic field at each voxel where respective one or more additional degrees of freedom were assigned.

The one or more halting criteria comprise a criterion for halting the calculating whenever determining, for each voxel in a region of the electromagnetic field, that a respective amount of energy loss for the electromagnetic field at the voxel meets a pre-determined energy threshold.

The determining, for each voxel, that the respective amount of energy loss for the electromagnetic field at the voxel meets the pre-determined energy threshold comprises determining an amount of energy loss on account of precision error at the voxel.

A method further comprises generating a respective predicted field gradient of the electromagnetic field for the each voxel using a neural network trained to (i) receive an input voxel within the simulation space and values defining the electromagnetic field, as input, and (ii) generate the respective predicted field gradient for the electromagnetic field at the voxel, as output; and wherein determining, for each voxel, whether to increase a respective numerical precision of respective values representing behavior of the electromagnetic field at the voxel above a threshold precision by the computer system and, in response, assigning one or more additional degrees of freedom to the voxel comprises determining that the respective predicted field gradient for the electromagnetic field at the voxel meets a pre-determined threshold.

Other advantages will be evident from the description below, the figures, and the claims.

DETAILED DESCRIPTION

Inverse computational design techniques can be applied to components that interact with electromagnetic fields, such as optical or photonic components. For example, such components can be designed based on a loss function defining a desired electromagnetic field within and around the component, and optimizing the composition and structure of the component by numerically solving Maxwell's equations for optical modes of interest using, e.g., a finite-difference time domain method. Generally, solutions to the inverse problem may be subject to other constraints, such as manufacturability of the interface.

Many of these structures are highly resonant or can otherwise present vanishing electromagnetic fields and/or gradients during the computational optimization. Requirements for computing devices implementing these structures can also be quite stringent, for example because the devices require that corresponding fields are represented with a high level of accuracy and are flexible to represent values over a large dynamic range for the electromagnetic field. Accordingly, such computations can present a problem due to finite floating-point precision, especially in low-precision operations such as those often performed using TPUs. The reduced precision can also limit the dynamic range of values that represent the electromagnetic field. Underflow or overflow means information is lost and accuracy is diminished or lost altogether; simulations might not proceed past a certain point, and even local optima for structures might not be found because of this issue.

In general, inverse computational design can involve simulation of a field in different regions. Each region is divided into multiple voxels where values for the electric field at that point in the field are calculated. Generally, memory associated with each voxel has a floating-point range that defines a precision in which the system can store the value of the electric and magnetic field at that point in space.

Described herein are embodiments of a physics simulator utilized to optimize structural parameters (e.g., physical traits or characteristics) of electromagnetic and other physical devices based on first-principles simulations. In particular, the physics simulator allows for a first-principles based design and optimization of physical devices based on their optical, electrical, magnetic, acoustic, and/or fluidic response (e.g., field response) to an excitation source. The physics simulator utilizes partial-differential equation (PDE) systems to model these optical, electrical, mechanical, fluidic, quantum dynamic, and other systems in a time-forward simulation, and optionally followed by backpropagation to determine the influence of structural parameters on a loss value of the physical device. However, the large state sizes (e.g., a physical device being represented in three-dimensions, or other dimensionality, by a quantity of voxels ranging from hundreds all the way to many billions) and simulation time steps (e.g., from hundreds to millions or billions of time steps) necessary to simulate these physical devices using the PDE systems and calculate performance gradients that are used for optimizing structural parameters may make the datasets intractable in terms of memory footprint for backpropagation, or even just the time-forward simulation.

The physical device being optimized is described using an N dimensional array (e.g., N=1, 2, 3, or more) of voxels that each describe one or more structural parameters (e.g., index of refraction, dielectric constant, permeability, or other relevant physical characteristics) of the physical device at a respective position or locale in N dimensional space. In other words, in one embodiment, the structural parameters are defined at per-voxel granularity. The initial description of the physical device to be optimized is further provided with a characterization of a desired input/output relationship such as a target output signal generated at an output region of the physical device in response to a source signal at a source region of the physical device. In various embodiments, operation of the physical device should be characterized by its field response to an excitation source, all of which are modeled using PDEs. In an embodiment where the physical device is an electromagnetic device (e.g., optical device, electrical device, etc.), the excitation source(s) and field response are characterized using Maxwell's equations and modelled using finite-difference-time-domain (FDTD) method (e.g., Yee's method) to discretize and model Maxwell's equations.

As mentioned above, the physics simulator allows for first-principles based design of novel devices with a reduced memory footprint (e.g., tractable) by modeling the field response of a physical device with PDE systems that may subsequently be encoded and compressed. This has applications in a wide variety of fields, including but not limited to, mechanical devices, optical devices, electromagnetic devices, quantum-dynamic devices, lasers, lenses, mechanical structures, transistors, and the like. This first-principles based design is not dependent on human intuition or expertise and generally may result in designs which outstrip current state-of-the-art designs as simultaneous, scalable optimization of a nearly unlimited number of design parameters may be achieved.

Figure 1:
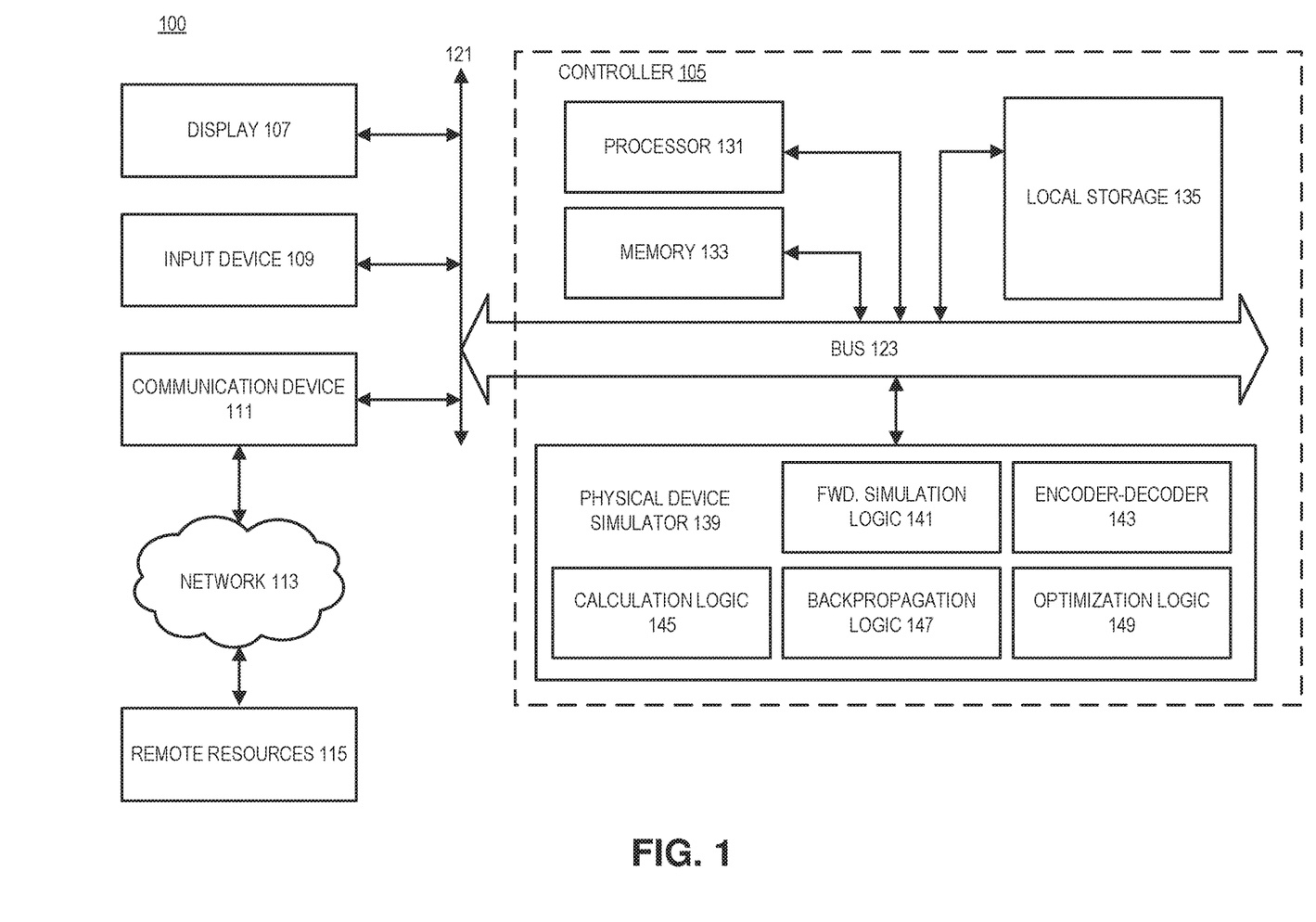
FIG. 1 is a functional block diagram illustrating a system for simulating and optimizing structural parameters of a physical device, in accordance with an embodiment of the present disclosure.

FIG. 1 is a functional block diagram illustrating system 100 for simulating and optimizing structural parameters of a physical device, in accordance with an embodiment of the disclosure. In the following embodiments, system 100 will be described in the context of simulating and optimizing an optical waveguide splitter as corresponding to the physical device. However, it is appreciated that the physical device is not limited to optical waveguides, and that other electromagnetic devices such as lasers, lenses, transistors, optical devices, quantum-dynamic devices, antennas, optoelectronic switches, mechanical structures, and the like may be represented by the term "physical device." System 100 provides first-principles based design and optimization of physical devices based on their optical, electrical, magnetic, acoustic, and/or fluidic response (e.g., field response) to an excitation source. In other words, it is appreciated that system 100 is not limited to modeling electromagnetic devices and that other devices having a field response to an excitation source may also be modeled and their structural parameters optimized. As long as the equations that describe the excitation source(s), field response, and output fields are differentiable (e.g., describable using partial differential equations), the techniques described herein may be applied.

As illustrated, system 100 includes a controller 105, a display 107, input device(s) 109, communication device(s) 111, network 113, remote resources 115, a bus 121, and a bus 123. The illustrated embodiment of controller 105 includes processor 131, memory 133, local storage 135, and a physical device simulator 139. The illustrated embodiment of physical device simulator 139 includes forward simulation logic 141, backpropagation logic 147, encoder-decoder 143, calculation logic 145, and optimization logic 149. It is appreciated that in some embodiments, controller 105 may be a distributed system. Furthermore, system 100 is merely one demonstrative system architecture, and other device architectures may be used.

Controller 105 is coupled to display 107 via buses 121 and 123 for displaying information to a user of system 100. Input device 109 is coupled to bus 123 through bus 121 for communicating information and command selections to processor 131. Input device 109 may include a mouse, trackball, keyboard, stylus, or other computer peripheral, to facilitate an interaction between the user and controller 105.

In response, controller 105 may provide verification of the interaction through display 107.

Communication device 111 is provided for accessing remote resources 115 of a distributed system via network 113. Communication device 111 may include any of a number of networking peripheral devices such as those used for coupling to an Ethernet, token ring, Internet, a wide area network, or otherwise. Communication device 111 may further include a null-modem connection, or any other mechanism that provides connectivity between controller 105 and the outside world. Note that any or all of the components of system 100 illustrated in FIG. 1 and associated hardware may be used in various embodiments of the present disclosure. The remote resources 115 may be part of a distributed system and include any number of processors, memory, and other resources for optimizing the structural parameters of a physical device being simulated.

The controller 105 orchestrates the operation of the system 100 for optimizing the structural (e.g., physical) parameters of the physical device. Processor 131 (e.g., one or more central processing units, graphics processing units, and/or tensor processing units, etc.), memory 133 (e.g., volatile memory such as DRAM and SRAM, non-volatile memory such as ROM, flash memory, and the like), local storage 135 (e.g., magnetic memory such as computer disk drives), and the physical device simulator 139 are coupled to each other through bus 123. Controller 105 includes software logic (e.g., instructions included in memory 133) and/or hardware logic (e.g., application specific integrated circuits, field-programmable gate arrays, and the like) that when executed by controller 105 causes controller 105 or system 100 to perform operations. The operations may be based on instructions stored within any one of, or a combination of, memory 133, local storage 135, physical device simulator 139, and remote resources 115 accessed through network 113. In one embodiment, physical device simulator 139 represents a software architecture that is stored within memory 133 or local storage 135 and executed by processor 131.

In the illustrated embodiment, the modules 141-149 of the physical device simulator 139 are utilized to optimize the structural parameters of the physical device under design. In some embodiments, system 100 optimizes the structural parameters of the physical device via, inter alia, simulations (e.g., forward simulation and adjoint simulation) that utilize the FDTD method to model the field response (e.g., both electric and magnetic fields). Forward simulation logic 141 provides instructions for performing forward simulations (e.g., field propagations originating at a source region and evolving outward towards an output region) while back-propagation logic 147 provides instructions for performing an adjoint simulation. In one embodiment, the adjoint simulation models a reverse field response that back propagates a loss value from the output region towards the input region through the voxels of the simulated environment. The loss value is a scalar generated by a loss function that compares (e.g., takes a mean squared difference) a parameter of interest (e.g., power) in the field response to the same parameter in a target field response at a designated time step (e.g., last time step) and at a designated location within the simulation environment (e.g., at the output of the physical device). In other words, the loss value operates as a source to be used in the adjoint simulation. Calculation logic 145 implements the loss function and computes the loss value based upon the forward simulated field response and a target field response.

The time-forward simulation models a field response of the simulated environment in response to excitation source(s). This field response may be computed at each voxel for every simulation time step, and field response values describing the field response at each voxel for each simulation time step may need to be stored for future reference when optimizing the structural parameters of the voxels. The sheer size of these datasets can be intractable in original uncompressed form. Accordingly, Encoder-decoder 143 operates to encode the field response values into compressed field response values having a reduced memory footprint that represents a tractable dataset. When accessing the compressed field response values, encoder-decoder 143 also serves to decode the data and extract regenerated field response values.

The regenerated field response values may serve a number of purposes related to optimizing the structural parameters of the physical device. In one embodiment, the regenerated field response values may be used by calculation logic 145 to compute one or more performance gradients (e.g., a field gradient, a loss gradient, and a structural gradient) during a backpropagation structural optimization. A gradient descent algorithm may then be executed by optimization logic 149 using the calculated performance gradients to optimize one or more structural parameters. In other embodiments, the regenerated field response values may be used in other manners while optimizing the structural parameters of the physical device. For example, the regenerated field response values may be referenced for debugging purposes, post processing visualization, or otherwise.

Figure 2A:
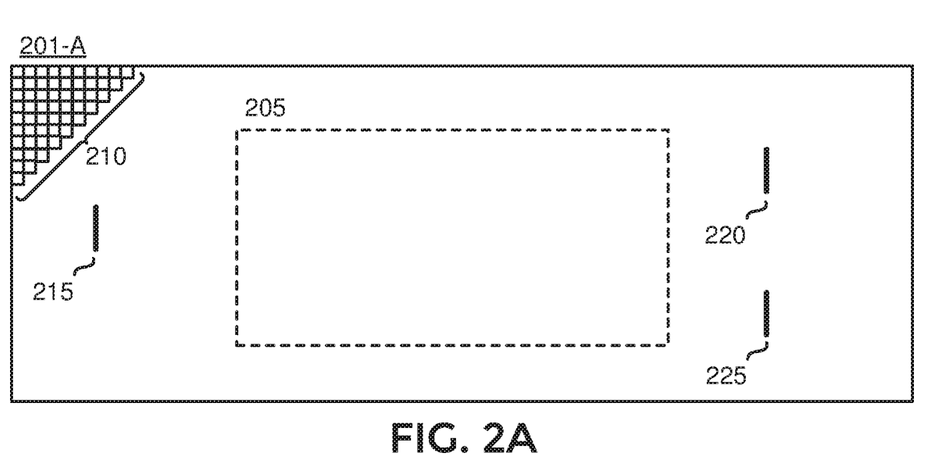
FIG. 2A illustrates an example rendering of a simulated environment describing an electromagnetic device, in accordance with an embodiment of the present disclosure.
Figure 2B:
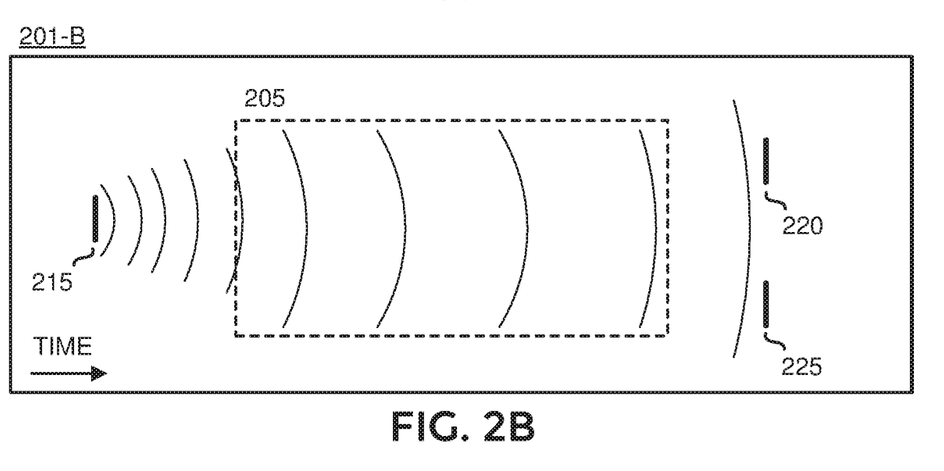
FIG. 2B illustrates an example time-forward simulation of the simulated environment describing the physical device, in accordance with an embodiment of the present disclosure.
Figure 2C:
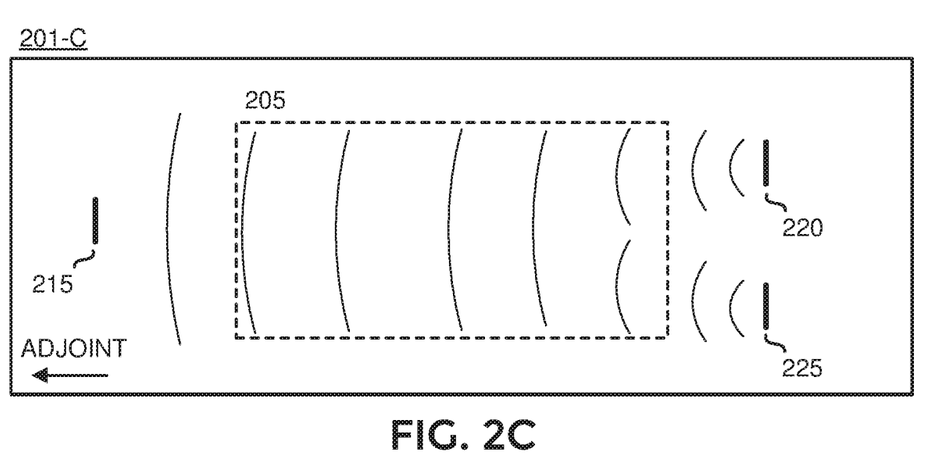
FIG. 2C illustrates an example backpropagation of the loss value backwards within the simulated environment describing the physical device, in accordance with an embodiment of the present disclosure.

FIGS. 2A-2C illustrate an initial setup, a time-forward simulation, and backpropagation of a simulated environment 201 for optimizing structural parameters of a physical device. The simulated environment 201 and corresponding initial setup, time-forward simulation, adjoint simulation, and structural parameter optimization may be achieved via a physics simulator such as that described by system 100 illustrated in FIG. 1. As illustrated in FIGS. 2A-2C, the simulated environment is represented in two-dimensions, however it is appreciated that higher (e.g., 3-dimensional space) and lower (e.g., 1-dimensional space) dimensionality may also be used to describe the simulated environment 201 and physical device. In some embodiments, the optimization of the structural parameters of the physical device illustrated in FIGS. 2A-2C may be achieved via, inter alia, simulations (e.g., time-forward and adjoint) that utilizes a FDTD method to model the field response (e.g., both electric and magnetic).

FIG. 2A illustrates an example rendering of a simulated environment 201-A describing an electromagnetic device, in accordance with an embodiment of the present disclosure. The simulated environment 201-A represents the simulated environment 201 at an initial time step (e.g., an initial set up) for optimizing structural parameters of the physical device. The physical device described by the simulated environment 201 may correspond to an optical waveguide having a designable region 205 in which the structural parameters of the simulated environment may be designed, modified, or otherwise changed. The simulated environment 201 includes an excitation source 215 (e.g., a Gaussian pulse, a wave, a waveguide mode response, and the like). The electrical and magnetic fields (e.g., field response) within the simulated environment 201 (and the physical device) may change in response to the excitation source 215. The specific settings of the initial structural parameters, excitation source, performance parameters, and other metrics (i.e., initial description) for a first-principles simulation of a physical device are input before the time-forward simulation starts. These specific values and parameters may be defined directly by a user (e.g., of the system 100 in FIG. 1), indirectly (e.g., via the controller 105 culling pre-determined values stored in memory 133, local storage 135, or remote resources 115), or a combination thereof.

As illustrated, the simulated environment 201 (and subsequently the physical device) is described by a plurality of voxels 210, which represent individual elements of the two-dimensional (or three-dimensional) space of the simulated environment. Each of the voxels is illustrated as two-dimensional squares, however it is appreciated that the voxels may be represented as cubes or other shapes in three-dimensional space. It is appreciated that the specific shape and dimensionality of the plurality of voxels 210 may be adjusted dependent on the simulated environment 201. It is further noted that only a portion of the plurality of voxels 210 are illustrated to avoid obscuring other aspects of the simulated environment 201. Each of the plurality of voxels 210 is associated with one or more structural parameters, a field value to describe a field response, and a source value to describe the excitation source at a specific position within the simulated environment 201. The field response, for example, may correspond to a vector describing the electric and/or magnetic field at a particular time step for each of the plurality of voxels 210. More specifically, the vector may correspond to a Yee lattice that discretizes Maxwell's equations for determining the field response. In some embodiments, the field response is based, at least in part, on the structural parameters and the excitation source 215.

FIG. 2B illustrates an example time-forward simulation of the simulated environment 201-B describing the physical device, in accordance with an embodiment of the present disclosure. The rendered simulated environment 201-B represents the time-forward simulation at a particular time step in which the excitation source 215 is active (e.g., generating waves originating at the excitation source 215 that propagate through the simulated environment 201). In one embodiment, the physical device is an optical waveguide operating at the frequency of interest and having a particular waveguide mode (e.g., transverse electromagnetic mode, transverse electric mode, etc.) and the excitation source is at an input of the optical waveguide having a specified spatial, phase, and temporal profile.

The time-forward simulation occurs over a plurality of time steps, including the illustrated time step. When performing the time-forward simulation, changes to the field response (e.g., the field value) for each of the plurality of voxels 210 are updated in response to the excitation source 215 and based, at least in part, on the structural parameters of the physical device at each of the plurality of time steps. Similarly, in some embodiments the source value is updated for each of the plurality of voxels (e.g., in response to the electromagnetic waves from the excitation source 215 propagating through the simulated environment). It is appreciated that the time-forward simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the time-forward simulation, field response values describing the field response are generated and need to be stored in a memory efficient manner. Accordingly, in one embodiment, encoder-decoder 143 encodes the field response values for each voxel at each time step into compressed field response values. In one embodiment, all field response values for a given time step are group encoded and compressed together. In other embodiments, the group encoding may span multiple time steps. The loss function may subsequently compute a loss value based upon a difference between the field response and a target field response at each output port 220 and 225 at a designated time step (e.g., a final time step of the time-forward simulation). The loss value is a scalar that may be described in terms of a specific performance value (e.g., power in a specific waveguide mode). Structural parameters may be optimized for this specific performance value.

FIG. 2C illustrates an example backpropagation of the loss value backwards within the simulated environment 201-C describing the physical device, in accordance with an embodiment of the present disclosure. In one embodiment, the adjoint simulation back propagates the loss value at the output ports 220 and 225 as a reverse excitation source for stimulating a reverse field response through voxels 210 of simulated environment 201-C. The backpropagation of the loss value uses regenerated field response values decoded from the compressed field response values to determine an influence of changes in the structural parameters of voxels 210 on the loss value. Again, a change in the reverse field response of each of the plurality of voxels 210 is incrementally updated for each of the plurality of time steps backwards in time.

While performing the backpropagation of the loss value through the simulated environment, at least three performance gradients may be calculated. First, at each time step, a field gradient is calculated for each voxel based upon the regenerated field response values from the time-forward simulation. The field gradient relates a change in the field response to a change in a structural parameter. Second, also at each time step, a loss gradient is calculated for each voxel based upon the field response. The loss gradient relates a change in the loss value to a change in the forward field response. Third, a structure gradient is calculated for each voxel by combining the field gradients with the loss gradients for all time steps. The structure gradient relates a change in the loss value to a change in a structural parameter. The total structure gradient is then obtained by summing all the structure gradients from each time step.

In some embodiments, iterative cycles of the time-forward and adjoint simulations are performed successively using an optimization scheme such as gradient descent to adjust the structural parameters of the physical device. More specifically, after each of the cycles adjustments to the structural parameters (e.g., optimization) are made to reduce a particular loss value of the loss function. The time-forward simulation, backpropagation, and optimization are repeated successively until the loss value substantially converges or falls within a threshold of a target loss value.

Figure 3A:
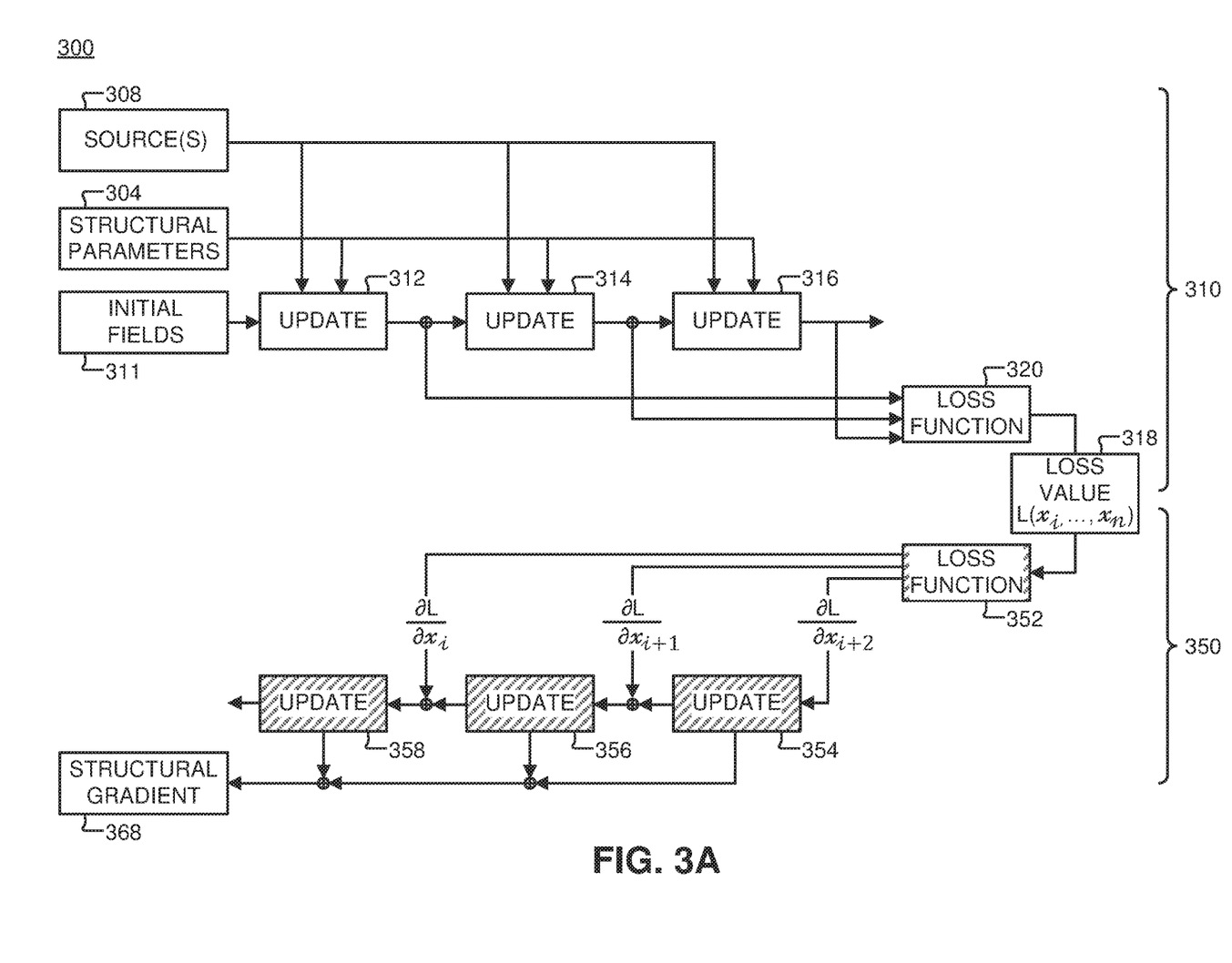
FIG. 3A is a flow chart illustrating example time steps for the time-forward simulation and backpropagation within a simulated environment, in accordance with an embodiment of the present disclosure.

FIG. 3A is a flow chart 300 illustrating example time steps for the time-forward simulation 310 and backpropagation 350 within a simulated environment, in accordance with an embodiment of the present disclosure. Flow chart 300 is one possible implementation that a system (e.g., system 100 of FIG. 1) may use to perform the time-forward simulation 310 and backpropagation 350 of the simulated environment (e.g., simulated environment 201 of FIGS. 2A-2C) describing an electromagnetic or other device. In the illustrated embodiment, the time-forward simulation utilizes a FDTD method to model the field response (both electric and magnetic) at a plurality of time steps in response to an excitation source. More specifically, the time-dependent Maxwell's equations (in partial differential form) are discretized to solve for field vector components (e.g., the field response of each of the plurality of voxels 210 of the simulated environment 201 in FIGS. 2A-2C) over a plurality of time steps.

As illustrated in FIG. 3A, the flow chart 300 includes update operations for a portion of time-forward simulation 310 and backpropagation 350. Time-forward simulation 310 occurs over a plurality of time-steps (e.g., from an initial time step to a final time step over a pre-determined or conditional number of time steps having a specified time step size) and models changes (e.g., from the initial field values 311) in electric and magnetic fields of a plurality of voxels describing the simulated environment and/or physical device that collectively correspond to the field response.

More specifically, update operations (e.g., 312, 314, and 316) are iterative and based on the field response, structural parameters 304, and one or more physical stimuli sources 308. Each update operation is succeeded by another update operation, which are representative of successive steps forward in time within the plurality of time steps. For example, update operation 314 updates the field values 313 (see, e.g., FIG. 3B) based on the field response determined from the previous update operation 312, sources 308, and the structural parameters 304. Similarly, update operation 316 updates the field values 315 (see, e.g., FIG. 3B) based on the field response determined from update operation 314. In other words, at each time step of the operational simulation the field values (and thus field response) are updated based on the previous field response and structural parameters of the physical device. Once the final time step of the time-forward simulation 310 is performed, the loss value 318 may be determined (e.g., based on a pre-determined loss function 320).

The loss gradients determined from block 352 may be treated as adjoint or excitation sources (e.g., physical stimuli or excitation source originating at an output region) which are backpropagated in reverse (from the final time step incrementally through the plurality of time steps until reaching the initial time step) to determine structural gradient 368.

In the illustrated embodiment, the FDTD solve (e.g., time-forward simulation 310) and backpropagation 350 problem are described pictorially, from a high-level, using only "update" and "loss" operations as well as their corresponding gradient operations. The simulation is set up initially in which the structure parameters, the excitation source, and the initial field states of the simulated environment (and electromagnetic device) are provided. As discussed previously, the field states are updated in response to the excitation source based on the structural parameters. More specifically, the update operation is given by $\phi$, where $x_{i+1} = \phi(x_i, b_i, z)$ for $i=1, \ldots, n$. Here, n corresponds to the total number of time steps (e.g., the plurality of time steps) for the time-forward simulation, $x_i$ corresponds to the field response (the field value associated with the electric and magnetic fields of each of the plurality of voxels) of the simulated environment at time step i, $b_i$ corresponds to the excitation source(s) (the source value associated with the electric and magnetic fields for each of the plurality of voxels) of the simulated environment at time step i, and z corresponds to the structural parameters describing the topology and/or material properties of the electromagnetic device.

It is noted that using the FDTD method, the update operation can specifically be stated as:

$$\phi(x_i, b_i, z) = A(z)x_i + B(z)b_i. \quad (1)$$

That is to say the FDTD update is linear with respect to the field and source terms. Concretely, $A(z) \in \mathbb{R}^{N \times N}$ and $B(z) \in \mathbb{R}^{N \times N}$ are linear operators which depend on the structure parameters, z, and act on the fields, $x_i$, and the sources, $b_i$, respectively. Here, it is assumed that $x_i$, $b_i \in \mathbb{R}^N$ where N is the number of FDTD field components in the time-forward simulation. Additionally, the loss operation is given by L=(xi, ..., xn), which takes as input the computed fields and produces a single, real-valued scalar (e.g., the loss value) that can be reduced and/or minimized. In terms of optimizing the structural parameters of the electromagnetic device, the relevant quantity to produce is dL/dz, which is used to describe the change in the loss value with respect to a change in the structural parameters of the electromagnetic device and is denoted as the "structural gradient" illustrated in FIG. 3A.

Figure 3B:
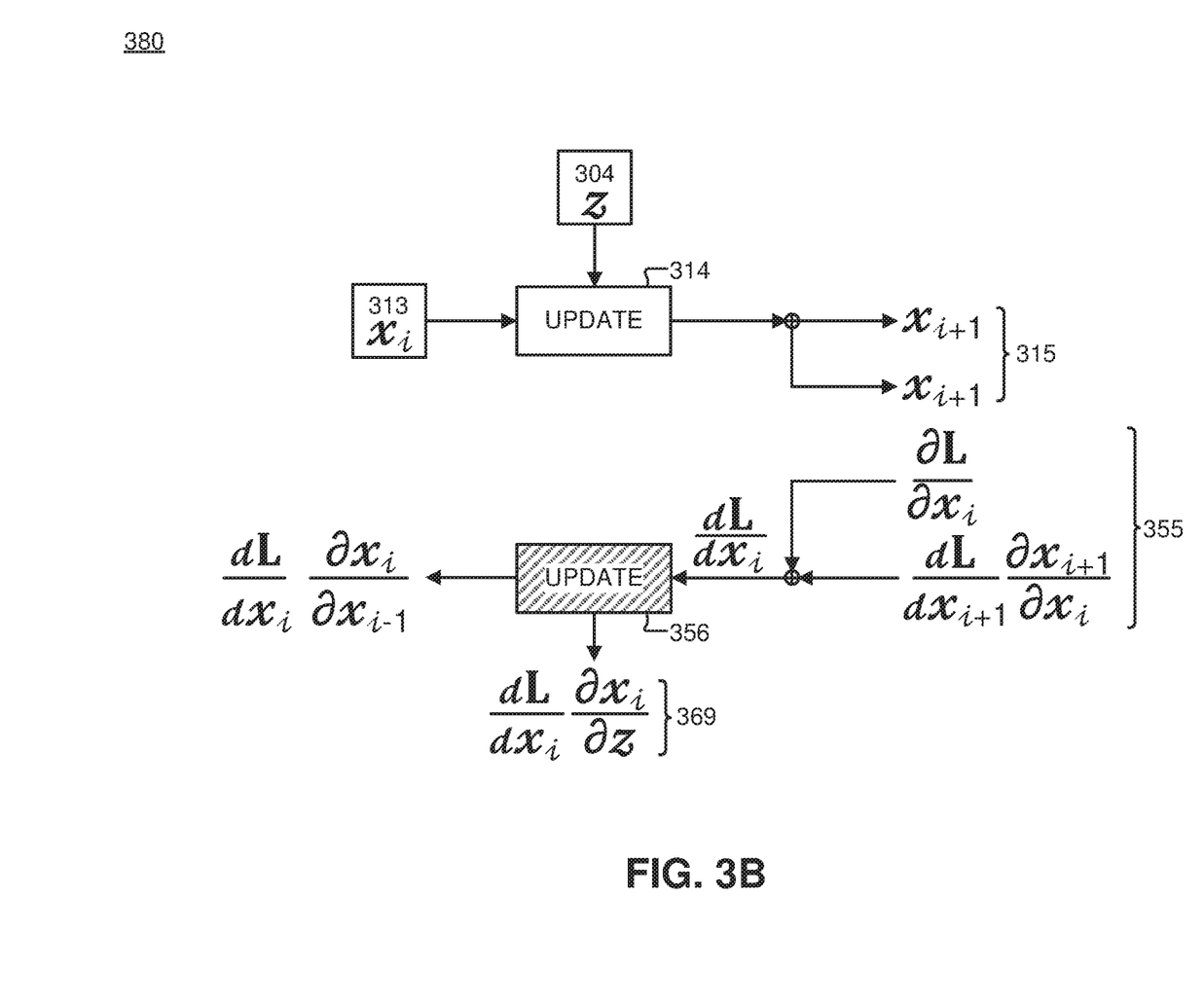
FIG. 3B is a flow chart illustrating the relationship between the update operation for the time-forward simulation and the backpropagation, in accordance with an embodiment of the present disclosure.

FIG. 3B is a chart 380 illustrating the relationship between the update operation for the time-forward simulation and the backpropagation, in accordance with an embodiment of the present disclosure. More specifically, FIG. 3B summarizes the time-forward and backpropagation relationships that are involved in computing $$\frac{dL}{dz},$$

which include $$\frac{\partial L}{\partial x_i}, \frac{\partial x_{i+1}}{\partial x_i}, \frac{dL}{dx_i}, \text{ and } \frac{\partial x_i}{\partial z}.$$

The update operation 314 updates the field values 313, $x_i$, based on the structural parameters 305, z, to the next field values 315, $x_{i+1}$. The gradients 355 are utilized to determine $$\frac{dL}{dx_i}$$

for the backpropagation (e.g., update operation 356 backwards in time) which combined with the gradients 369 are used, at least in part, to calculate $$\frac{dL}{dz} \cdot \frac{\partial L}{\partial x_i}$$

is the contribution of each field to L. It is noted that this is the partial derivative, and therefore does not take into account the causal relationship of $x_i \rightarrow x_{i+1}$. Thus, $$\frac{\partial x_{i+1}}{\partial x_i}$$

is utilized which encompasses the $x_i \rightarrow x_{i+1}$ relationship. The loss gradient, $$\frac{dL}{dx_i}$$

is also used to compute the structural gradient, $$\frac{dL}{dz}$$

and corresponds to the total derivative of the field with respect to loss value L. The loss gradient, $$\frac{dL}{dx_i},$$

at a particular time step, i, is equal to the summation of $$\frac{\partial L}{\partial x_i} + \frac{dL}{dx_{i+1}} \frac{\partial x_{i+1}}{\partial x_i}.$$

Finally, $$\frac{\partial x_i}{\partial z},$$

which corresponds to the field gradient, is used which is the contribution tc $$\frac{dL}{dz}$$

from each time/update step.

In particular, the memory footprint to directly compute $$\frac{\partial L}{\partial x_i} \text{ and } \frac{dL}{dz}$$

is so large that it is intractable to store more than a handful of state Tensors. The state Tensor corresponds to storing the values of all of the FDTD cells (e.g., the plurality of voxels) for a single simulation time step. (It is appreciated that the term "tensor" may refer to tensors in a mathematical sense or as described by the TensorFlow framework developed by Alphabet, Inc. In some embodiments the term "tensor" refers to a mathematical tensor which corresponds to a multidimensional array that follows specific transformation laws. However, in most embodiments, the term "tensor" refers to TensorFlow tensors, in which a tensor is described as a generalization of vectors and matrices to potentially higher dimensions (e.g., n-dimensional arrays of base data types), and is not necessarily limited to specific transformation laws.) For example, for the general loss function f, it may be necessary to store the fields, $x_i$, for all time steps, i. This is because, for most choices of f, the gradient will be a function of the arguments of f. This difficulty is compounded by the fact that the values of $$\frac{\partial L}{\partial x_i}$$

for larger values or i are needed before the values for smaller i, which may prevent the use of schemes that attempt to store only the values $$\frac{\partial L}{\partial x_i},$$

at the immediate time step.

The adjoint update is the backpropagation of the loss gradients from later to earlier time steps and may be referred to as a backwards solve for $$\frac{dL}{dx_i}.$$

The second term in the sum of the structural gradient, $$\frac{dL}{dz},$$

corresponds to the field gradient and is denoted as:

$$\frac{\partial x_i}{\partial z} = \frac{d\phi(x_{i-1}, b_{i-1}, z)}{dz} = \frac{dA(z)}{dz}x_{i-1} + \frac{dB(z)}{dz}b_{i-1}, \quad (6)$$

for the particular form of $\phi$ described by equation (1). Thus, without reduced representation, each term of the sum associated $$\frac{dL}{dz}$$

depends on both $$\frac{dL}{dx_{i_0}}$$

for $i >= i_0$ and $x_{i_o}$ for $i < i_0$. Since the dependency chains of these two terms are in opposite directions, it is concluded that computing $$\frac{dL}{dz}$$

in this way also requires me storage or $x_i$ values for all of ??, which may be intractable, without compressing the field response values as described below.

An additional difficulty in performing the backpropagation without a compressed representation is further illustrated when computing $$\frac{dL}{dz},$$

which is given by:

$$\frac{dL}{dz} = \sum_i \frac{dL}{dx_i}\frac{\partial x_i}{\partial z}. \quad (2)$$

For completeness, the full form of the first time in the sum, $$\frac{dL}{dz},$$

is expressed as:

$$\frac{dL}{dx_i} = \frac{\partial L}{\partial x_i} + \frac{dL}{dx_{i+1}}\frac{\partial x_{i+1}}{\partial x_i}. \quad (3)$$

Based on the definition of $\phi$ as described by equation (1), it is noted that $$\frac{\partial x_{i+1}}{\partial x_i} = A(z),$$

which can be be substituted in equation (3) to arrive at an adjoint update for backpropagation (e.g., the update operations such as update operation 356), which can be expressed as:

$$\frac{dL}{dx_i} = \frac{\partial L}{\partial x_i} + \frac{dL}{dx_{i+1}}A(z), \quad (4)$$

or $$\nabla_{x_i} L = A(z)^T \nabla_{x_{i+1}} L + \frac{\partial L^T}{\partial x_i}. \quad (5)$$

Techniques are described below for including additional degrees of freedom in memory associated with the same voxel and expressing a relationship between allocated memory according to the respective number of degrees of freedom associated with each voxel. An electromagnetic field simulation system implementing the inverse design tool can function with greater numerical precision by providing a higher precision floating-point on a per-voxel basis. As simulated fields decay and numerical precision becomes an issue (or as they accumulate and would otherwise produce overflow) additional variables can be introduced (and memory allocated if not pre-allocated) to account for this extra information.

Figure 4:
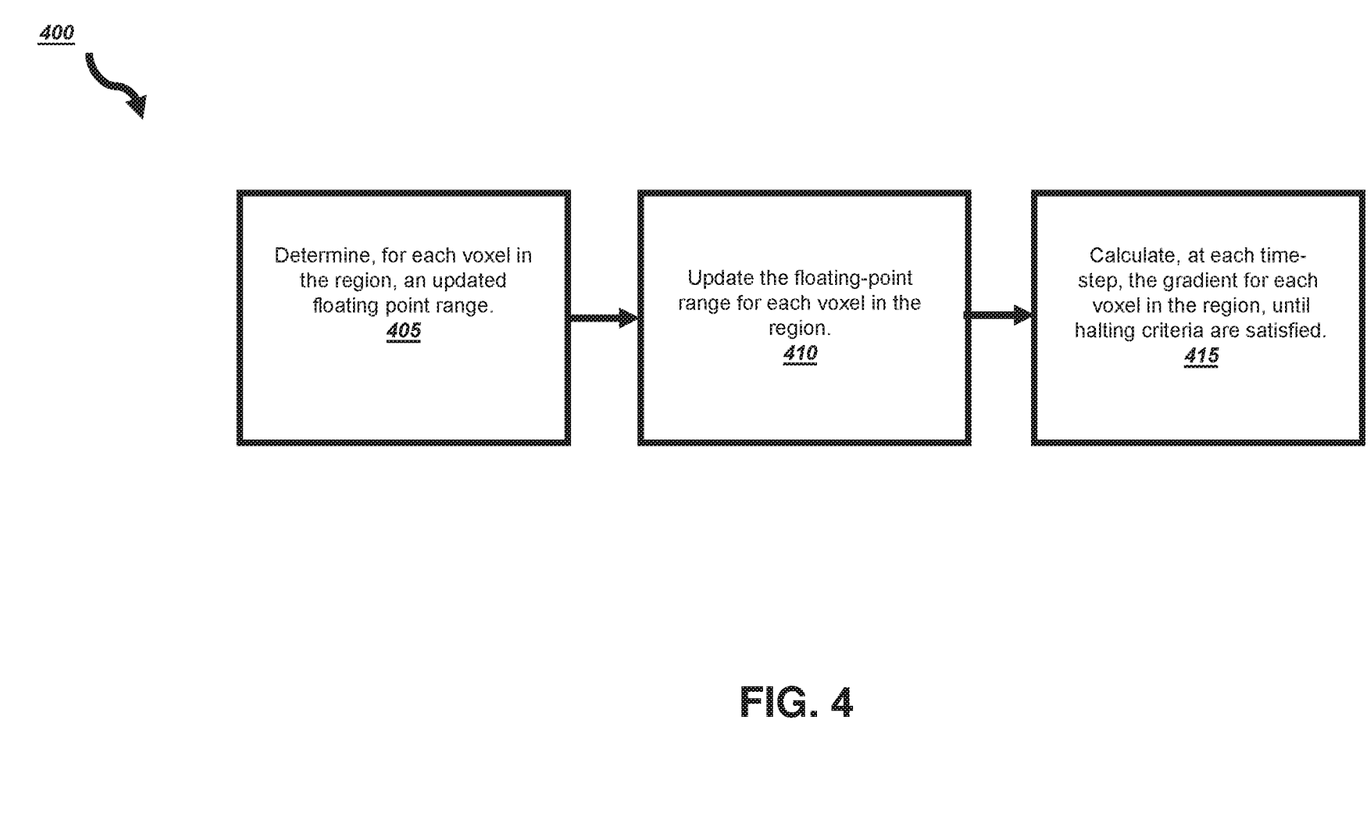
FIG. 4 is a flow chart of an example process for updating, for each voxel in a region, the floating-point range for the respective voxel.

FIG. 4 shows a flow chart of an example process 400 for updating, for each voxel in a region, the floating-point range for the respective voxel. For convenience, process 400 will be described as being performed by a system of one or more computers located in one or more locations. For example, an electromagnetic field simulation system including one or more data processing apparatuses (e.g., Tensor Processing Units) appropriately programmed can perform process 400. It is understood that the system can repeatedly perform the process 400 for each region in the field.

The system, for each voxel in the region, determines 405 a respective updated floating-point range.

In some implementations, the system directly measures each voxel for energy density, and determines an updated floating-point range in response to a measurement of energy density over or under respective pre-determined thresholds. For example, in response to the system measuring an energy density above a pre-determined threshold in a particular voxel, the system determines that the floating-point range for the particular voxel should be increased.

In some implementations, the system determines whether floating-point ranges for the voxels in the field should be updated, based on predicted behavior of the field in the region. For example, the system can compare the behavior of the region with an expected behavior, and determine, from the comparison, whether there is an overflow or underflow error. In response, the system determines an updated floating-point range for each voxel in the region.

The system can estimate a predicted behavior for regions in which EM field behavior is well-defined, such as when the region is a perfectly-matched layer, because the system generally has control over how coordinates scale, allowing for accurate prediction over behavior of the EM field across the voxels.

Alternatively or in addition, a neural network having one or more layers with one or more weights can be trained to determine whether the floating-point range for each voxel should be updated in the region. Specifically, the neural network generates, on the forward pass, a respective predicted EM field behavior at each voxel in the region, based on the behavior of the region for a given electromagnetic field. The neural network is then trained (i.e., the weights at each layer are updated by backpropagation) with a loss function (e.g., the difference between the predicted behavior of the EM field for voxels in the region and the actual behavior at those same voxels). The weights are updated to reduce the loss function, for example until convergence or until a pre-determined number of iterations of training is completed.

The result is a neural network that is trained to predict behavior of the EM field at a given voxel in a region. The predicted behavior is within a degree of accuracy sufficient to determine whether additional memory is required to represent a field gradient at the given pixel. At inference, the neural network can receive an input voxel and generate a predicted value of the EM field at that voxel.

If the system is simulating behavior for a different EM field, e.g., a different EM field for a new simulation, the system is configured to train a new neural network to predict behavior at each voxel for that EM field. The system can train a plurality of neural networks each trained to predict behavior of a respective EM field at a particular wavelength or within a range of wavelengths. Depending on the wavelength or range of wavelength of a target region, the system can process data defining the EM field to predict EM field behavior using a neural network trained on field data at the particular wavelength or range of wavelengths.

The electromagnetic field simulation system can compare the predicted behavior with the current behavior of the EM field at the voxel and compute a predicted field gradient. If the field gradient exceeds a pre-determined threshold, the system can update the floating-point range for the voxel by adding additional degrees of freedom, as described below. Similarly, the system can determine if the field gradient falls below a pre-determined threshold value for determining whether the floating-point precision at the voxel exceeds an amount of precision needed to represent the values for the EM field at the voxel. Note that the predicted field gradient is not required to be as accurate as the differentiable solver, described above, which models the EM field according to Maxwell's equations. Instead, the overall accuracy of the neural network in predicting field behavior at a voxel can be adjusted during training to come within a pre-determined threshold of precision sufficient for the electromagnetic field simulation system to determine that additional degrees of freedom are required for the voxel. For example, the neural network can be trained to predict field behavior within 1% of the actual field behavior at a given voxel.

In some implementations, the system determines that the respective floating-point ranges for one or more voxels in the region do not need to be updated.

The system updates 410 the respective floating-point range for each voxel in the region. For example, the system determines 405 an updated floating-point range for each voxel in the region, and applies the updated floating-point range for each voxel by adjusting how much memory each voxel can access. In some implementations, the system allocates or withholds memory for each voxel, based on the respective updated floating-point range for the voxel. In some implementations, the system allocates or withholds memory by a pre-determined factor, for each voxel in the region.

The system, at each time-step, calculates 415 one or more gradients for each voxel in the region. Having already determined whether additional degrees of freedom are required on a per-voxel basis, the system can calculate the gradient(s) for each voxel in the region with improved accuracy. The gradient(s) can include performance gradients that are used for optimizing structural parameters, as described above with reference to FIG. 1.

The system is configured to calculate gradients for each voxel and to determine whether to stop an ongoing simulation and check for adjustments to floating-point precision for voxels in a region upon meeting pre-determined criteria.

The system is configured to calculate gradient(s) for each voxel, until reaching a halting criteria and before determining updated floating-point ranges. Halting criteria are one or more conditions that when satisfied, cause the system to determine whether to update the floating-point range for each voxel in the region. In some implementations, halting criteria are met after a pre-determined number of time-steps (e.g., 10,000 time-steps) has passed. In some implementations, halting criteria are met when the system measures energy output below a certain threshold for the respective voxels in the region.

After meeting the halting criteria, the system determines whether a threshold amount of energy or information defining the EM field has been lost during calculation of the gradients. The loss of energy or information during simulation indicates at which regions additional precision is required, because the loss of energy is attributed to underflow or overflow of calculated gradients at each voxel.

In some implementations, the system halts the simulation upon detecting a sufficient loss of energy at the EM field represented in one or more voxels, without additional halting criteria. The system also distinguishes between energy lost as a result of precision error, and energy lost as part of simulation, e.g., absorptive losses, such as energy lost to Joule heating or radiation leaving the simulation. As described above, the system can implement a plurality of neural networks for predicting EM behavior at each voxel, which can include predicting the amount of energy loss as part of simulation of the EM field at the voxel. The system uses the predicted loss from simulation and compares it with the measured loss of energy at the voxel to determine how much energy is lost to precision error.

If the system determines that floating precision needs to be updated for identified voxels in the region, the system can update floating-point precision by adding or removing degrees of freedom for each identified voxel. Then, the system can resume computing field gradients, until meeting the halting criteria again or a separate termination criterion for ending the simulation. In some implementations, the system can restart simulation altogether, with the benefit of the added or removed degrees of freedom at the identified voxels. The system can restart computation automatically, or by following a determination that a threshold amount of energy in the EM field was lost, indicating that the voxels in the region were not assigned the requisite precision to avoid overflow or underflow.

In some implementations, after the system determines that the floating precision needs to be updated, the system can continue computing the gradients and, after the simulation is terminated, update the floating-point precision for the identified voxels. In some implementations, the system is configured to always wait until after simulation is complete to update the floating-point precision and restart simulation, or alternatively, the system waits to update the floating-point precision only if the amount of energy lost in the EM field is below a pre-determined threshold.

In implementations in which the system does not update floating-point precision until after meeting the halting criteria, the system can maintain the previous field gradient for the EM field at a voxel to recalculate a gradient and take advantage of additional degrees of freedom added to the voxel. The system can then systematically recalculate the respective field gradient for each voxel where degrees of freedom were added.

In some implementations, instead of systematically recalculating the field gradient for each voxel, the system can instead select which voxels to recalculate based on comparing an energy density measured at each voxel with an expected energy density expected for the computed region. For example, in some regions the energy density is expected to be quite high or quite low, and if the system measures a difference in the energy density at a voxel that meets a pre-determined threshold difference, the system can recompute the field gradient at the voxel using the higher floating-point precision.

The system can also subtract degrees of freedom corresponding to a voxel by techniques analogous to those described above. In general, subtracting degrees of freedom corresponds to reducing memory set-aside for storing values associated with a given voxel, in a manner analogous to how adding degrees of freedom corresponds to increasing numerical precision by adding memory for storing the values. The system subtracts degrees of freedom when the amount of numerical precision at a voxel is sufficient to represent values for the EM field at that voxel. Identifying voxels where degrees of freedom can be subtracted without materially affecting the accuracy of the computed field gradients is advantageous because memory that is not required to be set-aside for the voxel can be allocated for other purposes.

For example, where the system determines whether to add additional degrees of freedom in response to meeting a threshold, the system can also be configured to reduce the degrees of freedom of a voxel in response to meeting a different threshold precision. The threshold precisions for adding or removing degrees of freedom can be within a pre-determined range of each other, to prevent the system from adding or removing degrees of freedom about a single threshold. Then, the system can recalculate the field according to the reduced precision, and if the respective threshold value for reducing precision is not met, continue to reduce the degrees of freedom as necessary. If the system, upon recalculating the field gradient, determines that the field gradient meets the pre-determined threshold, the system can be configured to revert the reduction only as needed so the field gradient no longer meets the pre-determined threshold.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands-or even millions-of design choices, test configurations and learn from each iterative solution. Thus, aspects of the described implementations may use the machine learning engines in a generative design process to generate unique and bespoke solutions beyond those that a human being, alone, could create, to arrive at the best design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, Central Processing Units (CPUs), Graphics Processing Units (GPUs), and/or Tensor Processing Units (TPUs) can be used. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) monitor, or OLED (organic light emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for simulating an electromagnetic field interaction with a component, comprising:

defining, in computer memory of a computer system with a finite floating point precision, a loss function within a simulation space composed of a plurality of voxels each having a number of bits of memory, the simulation space encompassing one or more interfaces of the component, the loss function corresponding to a target electromagnetic field distribution for the component;

defining, in the computer memory, an initial structure for the one or more interfaces in the simulation space;

simulating, using the computer system, an electromagnetic field at each voxel using a finite-difference time domain solver to solve Maxwell's equations, wherein simulating comprises determining values for the electromagnetic field at each voxel; and determining, using the computer system, for each voxel, whether to increase a respective numerical precision of respective values representing behavior of the electromagnetic field at the voxel above a threshold precision by the computer system; and in response to determining to increase the respective numerical precision of the respective values, increasing the number of bits of memory associated with the voxel, wherein the increased number of bits of memory is related to increased numerical precision of values corresponding to the voxel in the computer memory, wherein, as a consequence of increasing the number of bits of memory associated with the voxel, numerical precision for the voxel is increased by a factor corresponding to an increase in the number of bits.

2. The method of claim 1, wherein the threshold precision is a first threshold precision, and the method further comprising:

determining, for each voxel, whether to decrease the respective numerical precision of respective values representing the behavior of the electromagnetic field at the voxel below a second threshold precision, and in response, decreasing the number of bits of memory associated with the voxel.

3. The method of claim 1, wherein determining the values for the electromagnetic field at each voxel comprises performing the determining before the determining whether to increase the respective numerical precision of the respective values and until meeting one or more halting criteria.

4. The method of claim 3, further comprising:
determining updated respective values for the electromagnetic field at each voxel where respective numbers of bits of memory were increased.

5. The method of claim 4, wherein the one or more halting criteria comprise a criterion for halting the determining whenever determining, for each voxel in a region of the electromagnetic field, that a respective amount of energy loss for the electromagnetic field at the voxel meets a pre-determined energy threshold.

6. The method of claim 5, wherein the determining, for each voxel, that the respective amount of energy loss for the electromagnetic field at the voxel meets the pre-determined energy threshold comprises determining an amount of energy loss on account of precision error at the voxel.

7. The method of claim 1, further comprising:
generating a respective predicted field gradient of the electromagnetic field for each voxel using a neural network trained to (i) receive an input voxel within the simulation space and values defining the electromagnetic field, as input, and (ii) generate the respective predicted field gradient for the electromagnetic field at the input voxel, as output; and
wherein determining, for each voxel, whether to increase a respective numerical precision of respective values representing the behavior of the electromagnetic field at the input voxel above a threshold precision by the computer system comprises determining that the respective predicted field gradient for the electromagnetic field at the input voxel meets a pre-determined threshold.

8. A computer system comprising:
one or more computers and one or more computer memory devices on which are stored instructions that are operable, wherein the computer memory devices are associated with a finite floating-point precision, and wherein the stored instructions, when executed by the one or more computers, cause the one or more computers to perform operations comprising:
defining a loss function within a simulation space composed of a plurality of voxels each having a number of bits of memory, in the one or more computer memory devices, the simulation space encompassing one or more interfaces of a component, the loss function corresponding to a target electromagnetic field distribution for the component;
defining an initial structure for the one or more interfaces in the simulation space;
simulating an electromagnetic field at each voxel using a finite-difference time domain solver to solve Maxwell's equations, wherein simulating comprises determining values for the electromagnetic field at each voxel; and
determining, for each voxel, whether to increase a respective numerical precision of respective values representing behavior of the electromagnetic field at the voxel above a threshold precision by the computer system; and
in response to determining to increase the respective numerical precision of the respective values, increasing the number of bits of memory associated with the voxel,
wherein increased number of bits of memory is related to increased numerical precision of values corresponding to the voxel in the one or more computer memory devices,
wherein, as a consequence of increasing the number of bits of memory associated with the voxel, numerical precision for the voxel is increased by a factor corresponding to an increase in the number of bits.

9. The computer system of claim 8, wherein the threshold precision is a first threshold precision, and wherein the operations further comprise:
determining, for each voxel, whether to decrease the respective numerical precision of respective values representing the behavior of the electromagnetic field at the voxel below a second threshold precision, and in response, decreasing the number of bits of memory associated with the voxel.

10. The computer system of claim 8, wherein determining the values for the electromagnetic field at each voxel comprises performing the determining before the determining whether to increase the respective numerical precision of the respective values and until meeting one or more halting criteria.

11. The computer system of claim 10, wherein the operations further comprise:
determining updated respective values for the electromagnetic field at each voxel where respective numbers of bits of memory were increased.

12. The computer system of claim 11, wherein the one or more halting criteria comprise a criterion for halting the determining whenever determining, for each voxel in a region of the electromagnetic field, that a respective amount of energy loss for the electromagnetic field at the voxel meets a pre-determined energy threshold.

13. The computer system of claim 12, wherein the determining, for each voxel, that the respective amount of energy loss for the electromagnetic field at the voxel meets the pre-determined energy threshold comprises determining an amount of energy loss on account of precision error at the voxel.

14. The computer system of claim 8, wherein the operations further comprise:
generating a respective predicted field gradient of the electromagnetic field for each voxel using a neural network trained to (i) receive an input voxel within the simulation space and values defining the electromagnetic field, as input, and (ii) generate the respective predicted field gradient for the electromagnetic field at the input voxel, as output; and
wherein determining, for each voxel, whether to increase a respective numerical precision of respective values representing the behavior of the electromagnetic field at the input voxel above a threshold precision by the computer system comprises determining that the respective predicted field gradient for the electromagnetic field at the input voxel meets a pre-determined threshold.

15. One or more non-transitory computer-readable storage media encoded with instructions that, when executed by one or more computers of a computer system with a finite floating point precision, cause the one or more computers of the computer system to perform operations comprising:
defining, in computer memory of the computer system, a loss function within a simulation space composed of a plurality of voxels each having a number of bits of memory, the simulation space encompassing one or more interfaces of a component, the loss function corresponding to a target electromagnetic field distribution for the component;

defining, in the computer memory, an initial structure for the one or more interfaces in the simulation space;

simulating an electromagnetic field at each voxel using a finite-difference time domain solver to solve Maxwell's equations, wherein simulating comprises determining values for the electromagnetic field at each voxel; and determining, for each voxel, whether to increase a respective numerical precision of respective values representing behavior of the electromagnetic field at the voxel above a threshold precision by the computer system; and in response to determining to increase the respective numerical precision of the respective values, increasing the number of bits of memory associated with the voxel, wherein increased number of bits of memory is related to increased numerical precision of values corresponding to the voxel, wherein, as a consequence of increasing the number of bits of memory associated with the voxel, numerical precision for the voxel is increased by a factor corresponding to an increase in the number of bits.

16. The computer-readable storage media of claim 15, wherein the threshold precision is a first threshold precision, and wherein the operations further comprise:

determining, for each voxel, whether to decrease the respective numerical precision of respective values representing the behavior of the electromagnetic field at the voxel below a second threshold precision, and in response, decreasing the number of bits of memory associated with the voxel.

17. The computer-readable storage media of claim 15, wherein determining the values for the electromagnetic field at each voxel comprises performing the determining before the determining whether to increase the respective numerical precision of the respective values and until meeting one or more halting criteria.

18. The computer-readable storage media of claim 17, wherein the operations further comprise:

determining updated respective values for the electromagnetic field at each voxel where respective numbers of bits of memory were increased.

19. The computer-readable storage media of claim 18, wherein the one or more halting criteria comprise a criterion for halting the determining whenever determining, for each voxel in a region of the electromagnetic field, that a respective amount of energy loss for the electromagnetic field at the voxel meets a pre-determined energy threshold.

20. The computer-readable storage media of claim 19, wherein the determining, for each voxel, that the respective amount of energy loss for the electromagnetic field at the voxel meets the pre-determined energy threshold comprises determining an amount of energy loss on account of precision error at the voxel.

21. The computer-readable storage media of claim 15, wherein the operations further comprise:

generating a respective predicted field gradient of the electromagnetic field for each voxel using a neural network trained to (i) receive an input voxel within the simulation space and values defining the electromagnetic field, as input, and (ii) generate the respective predicted field gradient for the electromagnetic field at the input voxel, as output; and wherein determining, for each voxel, whether to increase a respective numerical precision of respective values representing the behavior of the electromagnetic field at the input voxel above a threshold precision by the computer system comprises determining that the respective predicted field gradient for the electromagnetic field at the input voxel meets a pre-determined threshold.

* * * * *